J. H. & D. A. LAMENT.
Fruit Picker.
No. 79,292.
Patented June 23, 1868.
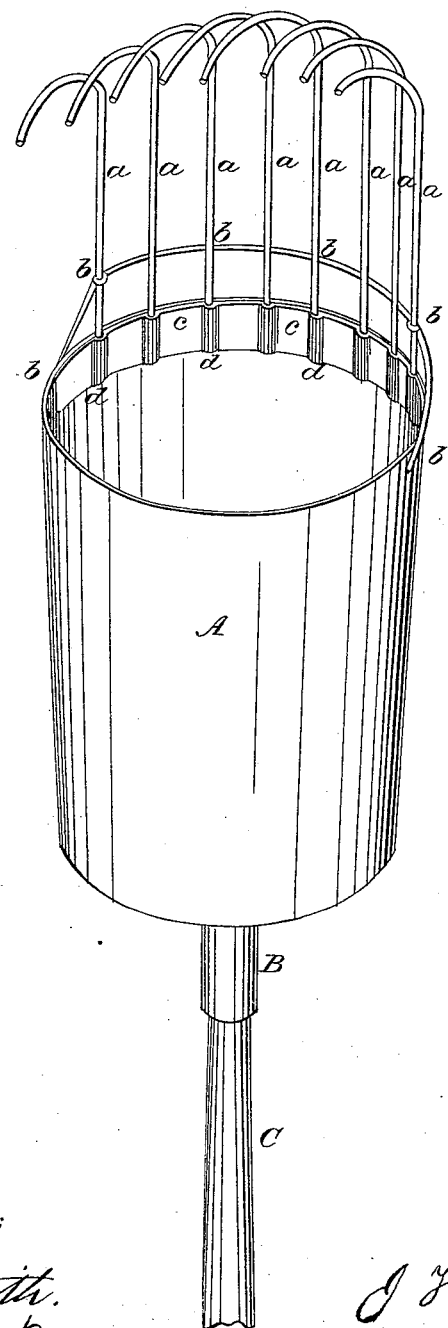

United States Patent Office.

JAMES H. LAMENT AND D. A. LAMENT, OF TROY, PENNSYLVANIA.

Letters Patent No. 79,292, dated June 23, 1868.

IMPROVEMENT IN FRUIT-PICKER.

*The Schedule referred to in these Letters Patent and making part of the same.*

TO ALL WHOM IT MAY CONCERN:

Be it known that we, JAMES H. LAMENT and D. A. LAMENT, of Troy, in the county of Bradford, and State of Pennsylvania, have invented a new and useful Improvement in Machine for Picking Fruit; and we do hereby declare that the following is a full, clear, and exact description thereof, reference being had to the accompanying drawing, in which—

A represents the vessel, into which the fruit drops when being picked.

B is a socket, formed and attached to the centre of the bottom of the vessel A, to receive the handle, which is marked C.

$a\ a\ a\ a\ a\ a\ a\ a$ are the fingers or pickers.

The nature of our invention consists in so forming and constructing a fruit-picker as to enable the person using it to handle it with facility, to introduce it among the branches of the tree on which the fruit to be picked grows, so as to pick any particular apple, peach, pear, or any other fruit to be gathered, and at the same time to have it so made that the fruit when pulled from the tree has but a few inches to drop, and thus bruising is prevented.

To enable others skilled in the art to which it appertains to make and use our invention, we describe it, as follows, viz:

We make the vessel A of any desired form and size, and of any suitable material, perhaps tin may be preferable. To the bottom we attach a socket, B, into which we introduce the end of the handle C, which we make of any suitable size and length, and of any suitable material. Oak, ash, or pine wood will do. We place on the interior of the vessel A, and at its top, a strip of thin metal, $c$, say tin, of any suitable width, about three-fourths of an inch, it being corrugated transversely, so as to form, when the said strip is attached to the vessel, sockets, as seen at $d\ d$, for the reception of the fingers $a\ a$. We then take wire, of any suitable size and kind, and cut it into pieces of the desired length to form the fingers, and bending the one end of each, we insert the other end of each into its respective socket in the strip $c$, and solder it therein, the strip $c$ being first soldered to the vessel A, or the fingers may be put into their sockets and fastened there while straight, and bent as desired afterwards. We then take a piece of wire, of suitable length and kind, and bend it around the fingers, about an inch from the top of the vessel A, and attach it to each finger by soldering it to them. We pass this wire once around each of the outside fingers, the more securely to attach it to them. We then pass each end of this wire from the said outside fingers down to the top of the vessel A, at any desired angle, and solder them fast to the vessel, all as seen in the drawing at $b\ b\ b\ b\ b\ b$.

From the foregoing description of our invention, it is clear that if the picker is taken and so handled as to pass the fingers between the fruit desired to be picked and the branch of the tree on which it grows, until the fruit is within their grasp, and then gently pull it, the fruit will be disengaged from the tree and drop into the vessel A without being bruised, its fall being but short.

Having thus fully described our invention, what we claim as new, and desire to secure by Letters Patent, is—

The combination, in a fruit-picker, of the vessel A and fingers $a\ a\ a\ a$, all substantially as shown and described.

JAS. H. LAMENT,
D. A. LAMENT.

Witnesses:
W. H. CARNOCHAN,
WM. LAMENT.